United States Patent [19]

Steinborn

[11] Patent Number: 5,632,112
[45] Date of Patent: May 27, 1997

[54] FISHING ROD HOLDER FOR ATTACHMENT TO DOCKS OR PIERS

[76] Inventor: Jon E. Steinborn, 442 Franklin St., Belvidere, Ill. 61008

[21] Appl. No.: 508,983

[22] Filed: Jul. 28, 1995

[51] Int. Cl.$^6$ .................................................. A01K 97/10
[52] U.S. Cl. ................................... 43/21.2; 248/540
[58] Field of Search .............................. 43/21.2; 248/540, 248/538, 539, 226.11, 231.41, 229.12, 214; 211/70.8

[56] References Cited

U.S. PATENT DOCUMENTS

| | | | |
|---|---|---|---|
| 2,003,535 | 6/1935 | Haskin | 248/540 |
| 2,935,118 | 5/1960 | Meilleur | 248/231.41 X |
| 3,601,919 | 8/1971 | Nixon | 43/21.2 |
| 3,667,708 | 6/1972 | Smeltzer | 43/21.2 X |
| 3,708,141 | 1/1973 | Friedgen et al. | 248/540 X |
| 3,903,634 | 9/1975 | Miyamae | 43/21.2 |
| 4,235,409 | 11/1980 | Cummings | 248/538 |
| 4,637,156 | 1/1987 | Simmons | 43/21.2 |
| 4,803,794 | 2/1989 | Lopez | . |
| 4,854,796 | 8/1989 | Wise | 248/226.11 X |
| 5,115,598 | 5/1992 | Shaw | 43/21.2 |

*Primary Examiner*—Joseph J. Hail, III
*Assistant Examiner*—Jay A. Stelacone
*Attorney, Agent, or Firm*—Donald A. Kettlestrings

[57] ABSTRACT

A fishing rod holder for attachment to a dock or pier having horizontal planks spaced a first distance apart from each other includes an externally threaded shaft having a bar fixedly connected to a first end of the shaft. The bar defines; a width less than the first distance and a length greater than the first distance, and a nut is rotatably mounted on the shaft. The nut defines length and width dimensions greater than the first distance, and a handle is mounted on the shaft between the nut and a second end of the shaft. A rod holding device is mounted on the shaft between the handle and the second end of the shaft for adjustably receiving and holding a fishing rod.

15 Claims, 1 Drawing Sheet

5,632,112

FISHING ROD HOLDER FOR ATTACHMENT TO DOCKS OR PIERS

BACKGROUND OF THE INVENTION

This invention relates to fishing rod holders and more particularly to a fishing rod holder for attachment to a dock or pier.

Holding a fishing rod when fishing from a dock or pier can be tiring. Accordingly, the present invention provides a fishing rod holder for attachment to a dock or pier.

An object of the present invention is the provision of a fishing rod holder for attachment to a dock or pier having horizontal planks spaced apart from each other.

Another object is to provide such a fishing rod holder which can be quickly and easily attached to a dock or pier.

A further object of the invention is the provision of such a fishing rod holder which permits the rod to be adjustably positioned within the fishing rod holder.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a fishing rod holder for attachment to a dock or pier having horizontal planks spaced a first distance apart from each other, the holder comprising: an externally threaded shaft defining first and second opposed ends; a bar connected to the first end of the shaft, the bar defining a width less than the first distance and a length greater than the first distance; a first nut rotatably mounted on the shaft, the nut defining length and width dimensions greater than the first distance; a handle mounted on the shaft between the first nut and a second end of the shaft; and rod holding means mounted on the shaft between the handle and the second end of the shaft.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate an example of a preferred embodiment of the invention and, together with the description, serve to explain the principles of the invention.

DESCRIPTION OF THE PREFERRED EMBODIMENT

Figure 1:
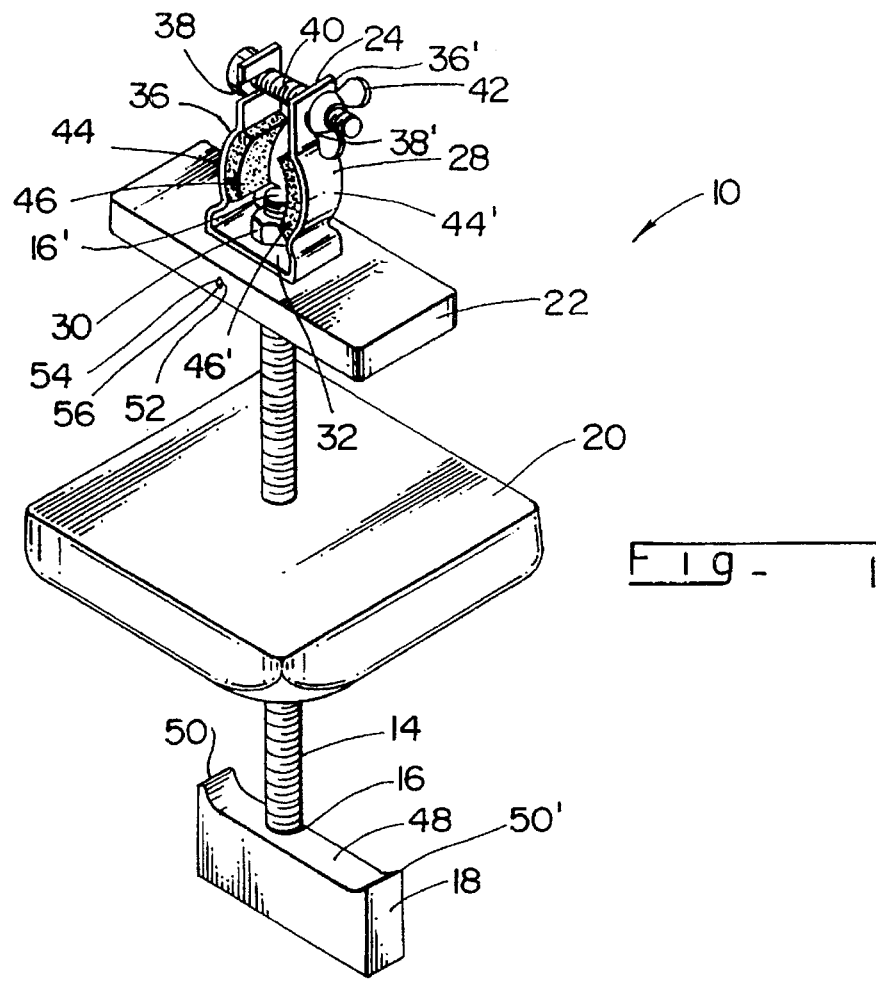
FIG. 1 is a perspective view of the fishing rod holder.

With reference now to the drawings, wherein like reference characters designate like or corresponding parts throughout the several views, there is shown a fishing rod holder 10 for attachment to a dock or pier having horizontal planks 12, 12' spaced a first distance D apart from each other.

In accordance with the invention, rod holder 10 includes an externally threaded shaft 14 defining first and second opposed ends 16, 16', respectively. A bar 18 is connected to first end 16 of shaft 14, and bar 18 defines a width less than distance D and a length greater than distance D. This is best seen in FIG. 1.

A first locking nut 20 is rotatably mounted on shaft 14, and nut 20 defines length and width dimensions greater than distance D. This configuration is also best illustrated in FIG. 1.

A handle 22 is mounted on shaft 14 between nut 20 and end 16' of shaft 14. Rod holding means generally indicated at 24 are adjustably mounted on shaft 14 between handle 22 and end 16' of shaft 14 for removably receiving and holding a fishing rod 26.

In accordance with the invention, rod holding means 24 include an adjustable clamp 28 for removably receiving and clamping fishing rod 26. Clamp 28 is preferably rotatably mounted on shaft 14. Rod holding means 24 further include a second nut 30 rotatably mounted on shaft 14 between clamp 28 and end 16' of shaft 14 for tightening against clamp 28 to selectively hold clamp 28 in fixed position between nut 30 and handle 22.

Clamp 28 includes a yoke element 32 which defines a first opening 34 therein for slideably receiving shaft 14 within opening 34. Opening 34 can be threaded to threadably engage the exterior threads of shaft 14, or opening 34 may not be threaded but of sufficient diameter to slideably receive threaded shaft 14 therein.

Clamp 28 also preferably includes first and second opposed resilient arm members 36, 36' which extend upwardly from yoke element 32 and which define second and third openings 38, 38', respectively, therein. A threaded bolt 40 is removably positioned through openings 38, 38', and a third nut 42 is rotatably mounted on bolt 40 in a conventional manner.

Each of arm members 36, 36' defines outwardly curved portions 44, 44', respectively, for receiving fishing rod 26 therebetween. Padding 46, 46' is preferably attached in a conventional manner to interior surfaces of curved portions 44, 44', respectively, for engaging fishing rod 26.

Opening 38 is preferably a slot defining a first open end and a second closed end, and opening 38' is preferably an elongated closed ended slot.

Figure 2:
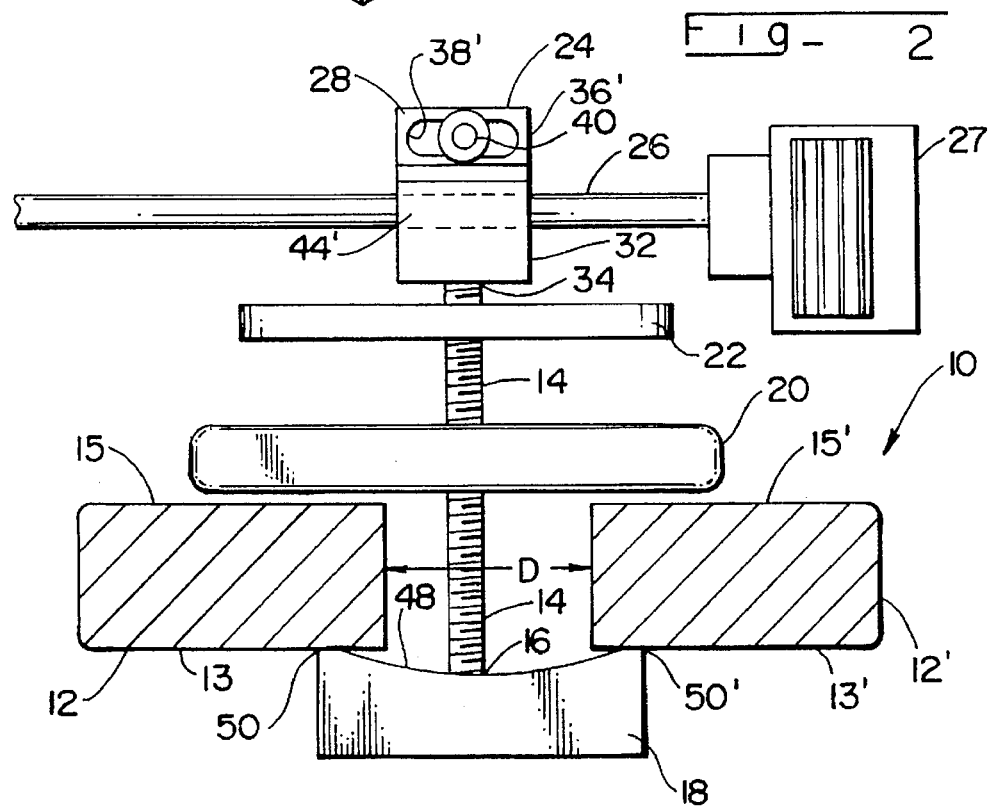
FIG. 2 is a side elevational view showing the fishing rod holder attached to a dock or pier.

Bar 18 includes a top surface 48 which defines first and second opposed end edge surfaces 50, 50' for engaging undersides 13, 13' of planks 12, 12' when fishing rod holder 10 is attached to the dock or pier. This is best illustrated in FIG. 2. Top surface 48 of bar 18 is preferably concave between end edge surfaces 50, 50' so that only end edge surfaces 50, 50' engage undersides 13, 13' of planks 12, 12' when fishing rod holder 10 is attached to the dock or pier.

Bar 18 is preferably fixedly connected to shaft 14, and handle 22 is preferably rotatably mounted on shaft 14. Bar 18 and handle 22 are each elongated in shape for enabling a user of fishing rod holder 10 to position handle 22 in parallel relationship with bar 18. This will facilitate alignment and insertion of bar 18 between planks 12, 12' if bar 18 is not visible to the user because bar 18 may be obscured from view by locking nut 20. Handle 22 can be used as a guide to properly align bar 18 with the space between planks 12, 12'.

In accordance with the invention, fishing rod holder 10 further includes means generally indicated at 52 in operative relationship with handle 22 and with shaft 14 for selectively holding handle 22 in fixed position on shaft 14. Specifically, handle holding means 52 preferably include a threaded opening 54 defined within handle 22 and a set screw 56 adjustably positioned within opening 54 for selectively engaging shaft 14 to hold handle 22 in fixed position on shaft 14.

Shaft 14, bolt 40 and nuts 30, 42 are preferably made of metal, such as stainless steel or aluminum. Bar 18, nut 20, handle 22 and clamp 28 are preferably comprised of metal or plastic, and if comprised of metal, stainless steel or aluminum is preferred.

In operation and use, handle 22 is preferably rotated on shaft 14 to a position in alignment with bar 18. Set screw 56 is then tightened within opening 54 in handle 22 to fix and hold handle 22 in position with respect to shaft 14. The parallel relationship between handle 22 and bar 18 will assist the user in fitting bar 18 downwardly and through the gap between adjacent planks 12, 12' of the dock or pier if bar 18 is obscured from view of the user by nut 20. The user can then use the position of handle 22 as a guide for positioning bar 18 downwardly and through the gap between adjacent planks 12, 12'.

The user then grasps handle 22 and positions handle 22 and bar 18 in alignment with and above the space between adjacent planks 12, 12' of the dock or pier. Fishing rod holder 10 is then lowered so that bar 18 passes downwardly and through the space between adjacent planks 12, 12'. When bar 18 has been lowered to a position beneath lower surfaces 13, 13' of planks 12, 12', the user then rotates assembly 10 so that handle 22 and bar 18 are oriented perpendicularly to the elongated slot or space between adjacent planks 12, 12'. This position of fishing rod holder 10 is shown in FIG. 2.

The user will then hold fishing rod holder 10 in the position shown in FIG. 2 by continuing to grasp handle 22. The user can then rotate locking nut 20 downwardly along threaded shaft 14 until locking nut 20 engages upper surfaces 15, 15' of planks 12, 12'. Tightening of locking nut 20 against upper surfaces 15, 15' will cause end edge surfaces 50' of bar 18 to tightly engage lower surfaces 13, 13' of planks 12, 12' while locking nut 20 will tightly engage upper surfaces 15, 15'. In this manner, rod holder 10 will be firmly held in position with respect to adjacent planks 12, 12' of the dock or pier.

The position of clamp 28 can then be adjusted by rotating clamp 28 and its opening 34 about shaft 14. When the desired position for clamp 28 is reached, the user then tightens nut 30 downwardly on shaft 14 and against yoke element 32 so that yoke element 32 is tightly held between nut 30 and handle 22.

Nut 42 can then be loosened on bolt 40 to permit bolt 40 to be laterally removed through the open end of opening 38. Bolt 40 can then be pulled through opening 38' until the head of the bolt engages the inside of arm member 36' The elongated slot configuration of opening 38' in arm member 36' enables lateral movement of bolt 40 and removal of bolt 40 from open-ended slot 38. Alternatively, nut 42 can be removed from bolt 40 and bolt 40 can be removed from openings 38, 38'.

Fishing rod 26 can then be inserted within clamp 28 by positioning the fishing rod between resilient arm members 36, 36' and with the rod between padding 46, 46'. Bolt 40 can then be repositioned within openings 38, 38', and nut 42 can then be tightened on bolt 40 to cause resilient arm members 36, 36' to move toward each other and to tightly engage and to clamp fishing rod 26 in fixed position with respect to clamp 28.

Fishing rod 26 can be removed from clamp 28 by reversing the process described for inserting and clamping the rod within the clamp. Fishing rod holder 10 can be removed from the pier or dock by loosening locking nut 20 and by rotating fishing rod holder 10 so that bar 18 can be withdrawn upwardly and through the space between adjacent planks 12, 12'.

It is preferred that opening 34 within clamp 28 be significantly larger in diameter than the outside diameter of shaft 14. This will permit clamp 28 to rock forward and backward or to tip with respect to shaft 14 when nut 30 is not completely tightened downwardly onto yoke element 32. This will permit clamp 28 to be tilted when fishing rod 26 is held within the clamp so that the fishing rod can be angled or tilted with respect to horizontal. This tilting of clamp 28 can be accomplished by adjusting the position of fishing rod 26 within clamp 28 so that the heavier handle and reel portions 27 of fishing rod 26 will cause clamp 28 to tilt with respect to shaft 14 as rod 26 is adjusted back and forth within clamp 28.

Handle 22 can be permanently fixedly attached to shaft 14 and in parallel relationship with bar 18. However, it is preferred that handle 22 be adjustably positionable with respect to shaft 14 as previously described. Upper surface 48 of bar 18 could be flat instead of concave, but the concave configuration described and illustrated is preferred so that end edge surfaces 50, 50' more firmly engage and grip undersides 13, 13' of planks 12, 12'.

The invention in its broader aspects is not limited to the specific details shown and described, and departures may be made from such details without departing from the principles of the invention and without sacrificing its chief advantages.

What is claimed is:

1. A fishing rod holder for attachment to a dock or pier having substantially horizontal planks spaced a first distance apart from each other, said holder comprising:

an externally threaded shaft defining first and second opposed ends and a longitudinal axis;

a bar connected to said first end of said shaft, said bar defining a width less than said first distance and a length greater than said first distance;

a first nut rotatably mounted on said shaft, said nut defining length and width dimensions greater than said first distance;

a handle mounted on said shaft between said first nut and said second end of said shaft; and rod holding means rotatably mounted on said shaft for rotation around said longitudinal axis between said handle and said second end of said shaft for removably receiving and holding a fishing rod.

2. A fishing rod holder as in claim 1 wherein said rod holding means include an adjustable clamp for removably receiving and clamping a rod within said clamp.

3. A fishing rod holder as in claim 2 wherein said clamp is rotatably mounted on said shaft for rotation around said longitudinal axis.

4. A fishing rod holder as in claim 3 wherein said rod holding means further include a second nut rotatably mounted on said shaft between said clamp and said second end of said shaft for tightening against said clamp to selectively hold said clamp in fixed position between said second nut and said handle.

5. A fishing rod holder as in claim 4 wherein said clamp includes:

a yoke element defining a first opening therein for slideably receiving said shaft within said first opening;

first and second opposed resilient arm members extending upwardly from said yoke element and defining second and third openings, respectively, therein;

a threaded bolt removably positioned through said second and third openings; and a third nut rotatably mounted on said threaded bolt.

6. A fishing rod holder as in claim 5 wherein said arm members each define outwardly curved portions for receiving a fishing rod therebetween.

7. A fishing rod holder as in claim 6 further including padding attached to said curved portions for engaging said rod.

8. A fishing rod holder as in claim 6 wherein said second opening is a slot defining a first open end and a second closed end and wherein said third opening is an elongated closed ended slot.

9. A fishing rod holder as in claim 1 wherein said bar includes a top surface defining first and second opposed end edge surfaces for engaging undersides of said planks when said fishing rod holder is attached to said dock or pier.

10. A fishing rod holder as in claim 9 wherein said top surface of said bar is substantially concave between said end edge surfaces, whereby only said end edge surfaces engage undersides of said planks when said fishing rod holder is attached to said dock or pier.

11. A fishing rod holder as in claim 1 wherein said bar is fixedly connected to said shaft.

12. A fishing rod holder as in claim 11 wherein said handle is rotatably mounted on said shaft for rotation around said longitudinal axis.

13. A fishing rod holder as in claim 12 further including adjustable screw means in operative relationship with said handle and with said shaft for selectively holding said handle in fixed position on said shaft.

14. A fishing rod holder as in claim 13 wherein said handle holding means include a threaded opening defined within said handle, and a set screw adjustably positioned within said opening for selectively engaging said shaft to hold said handle in fixed position on said shaft.

15. A fishing rod holder as in claim 12 wherein said bar and said handle are each elongated in shape for enabling a user of said fishing rod holder to position said handle in substantially parallel relationship with said bar.

* * * * *